Figure 1:
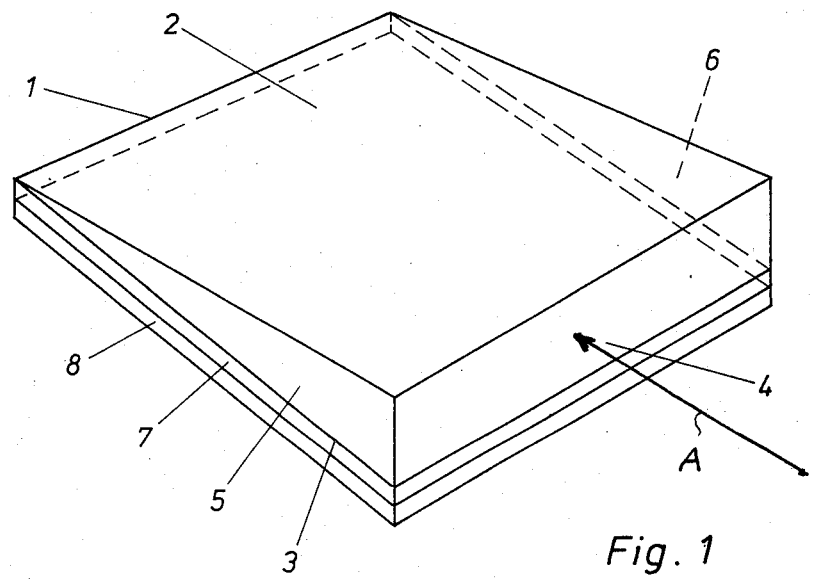

United States Patent [19]

Hehr

[11] 4,277,817
[45] Jul. 7, 1981

[54] LARGE-AREA LIGHT SOURCE

[75] Inventor: Wilfried Hehr, Hildesheim-Himmelsthür, Fed. Rep. of Germany

[73] Assignee: Blaupunkt-Werke GmbH, Hildesheim, Fed. Rep. of Germany

[21] Appl. No.: 48,040

[22] Filed: Jun. 13, 1979

[30] Foreign Application Priority Data

Jun. 23, 1978 [DE] Fed. Rep. of Germany ... P 2827573

[51] Int. Cl.³ .............................................. F21V 7/04
[52] U.S. Cl. ....................................... 362/31; 362/26; 362/354
[58] Field of Search ............................. 362/31, 26, 354

[56] References Cited

U.S. PATENT DOCUMENTS 4,059,916  11/1977  Tachihara et al. ..................... 362/31

Primary Examiner—Stephen J. Lechert, Jr
Attorney, Agent, or Firm—Frishauf, Holtz, Goodman & Woodward

[57] ABSTRACT

To provide for uniform output throughout the area of the light source, particularly to provide a background illuminating surface for liquid crystal display, an especially adapted for automotive application, the light-emitting surface is formed as a wedge-shaped body of transparent material, such as Plexiglas, with light being coupled thereinto at the wider side surface, the bottom surface of the wedge-shaped body having, preferably, a reflective, light dispersing layer or coating applied thereto, for example in form of a white pigmented lacquer, white paper, a ceramic plate, or the like; an intermediate layer of light-transmissive material having an index of refraction less than the index of refraction of the body may be interposed between the surface of the body and the reflective coating of layer. The top surface of the body can be matte, for example formed by microgrooves extending transversely to the plane of the side surface through which light is coupled into the wedge-shaped body. The light can be coupled thereinto derived, for example, from an incandescent bulb.

4 Claims, 2 Drawing Figures

LARGE-AREA LIGHT SOURCE

The present invention relates to a large-area light source, and more particularly to a light source which is suitable as in illuminated background surface for use with liquid crystal (LC) display (LCD), which may be used for example as LCDs in vehicles, for which the structure of the present application is particularly applicable.

BACKGROUND AND PRIOR ART

Large-area light sources are well known and used, for example, to illuminate flat, transparent indicators such as dials behind which a pointer may move and, also LCDs. Generally, the light sources are formed in plate-form of light-transmissive material, having a narrow edge surface which is exposed to light from a prime light radiating device, such as an incandescent lamp or the like. The light is reflected within the plate itself and thus causes the entire plate to emit light at the major planes or surfaces thereof.

When used in combination with an LCD, light is introduced at one of the narrow side surfaces, generated by a small incandescent lamp, and is emitted from one of the major plane surfaces of the plates through the LCD display.

Large-area light sources have, generally, the disadvantage that the density of light emission, that is, the lumens per $cm^2$ from the flat plane surfaces of the light source, is non-uniform. Light sources of this type provide output displays which are frequently not suitable for many uses since the non-uniform brightness of the background display may result in insufficient illumination of areas which should be illuminated, thus leading to misreading of information which is to be displayed by the LC display array.

THE INVENTION

It is an object to provide a large-area light source, particularly a light source which is useful as a background light source for a flat LCD, in which the brightness of the light source is essentially uniform throughout its entire extent, although illuminated only at one side.

Briefly, the light source is formed as a wedge-shaped body, with light being introduced at one side surface which connects the wider portion of the wedge, that is, of the major flat surfaces thereof, for transmission of light through one of the two major surfaces. In accordance with a feature of the invention, the surface through which light is not to be emitted is coated with a reflective coating and an opaque coating. In accordance with another feature of the invention, the major surface of the wedge-shaped body which is opposite the surface from which light is to be emitted, is coated with an intermediate layer having an optical index of refraction which is less than the index of refraction of the material of the wedge-shaped body itself. This coating, then, has another coating applied thereon which is reflective and, preferably, also has dispersing effects, such as a reflective pigmental layer. The intermediate layer may be applied, for example, as a clear lacquer on the major surface of the wedge-shaped body which is opposite that from which light is to be emitted, and a pigment layer then applied over the clear lacquer as a layer of white lacquer.

The surface of the wedge-shaped body can be treated to have ground-glass characteristics, or can be slightly grooved, that is, formed with microgrooves, located uniformly from each other to obtain the matte appearance or ground-glass effect. If grooving is used, the grooves preferably are parallel to the base surface of the wedge. A light dispersing, reflecting layer at the bottom of the wedge-shaped body—that is, at the surface from which light is not to be transmitted—further increases the brightness of the light source.

The wedge-shaped body provides the desired effect of an essentially uniform light density throughout the entire surface thereof, without any complex optical arrangements, and permits introduction of light into the wide edge of the wedge-shaped body by coupling an ordinary incandescent lamp, for example an automotive-type 12 V incandescent lamp, thereto. Other light sources, of course, can be used in accordance with desired applications.

DRAWING

Figure 2:
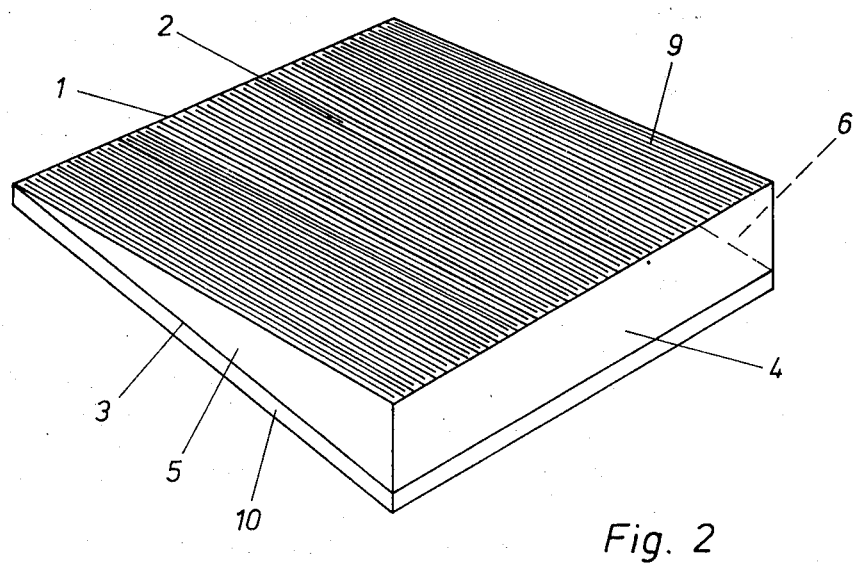

Illustrating preferred embodiments:

FIG. 1 is a perspective view, partly in phantom representation, of a wedge-shaped light source in which the side opposite that from which light is to be emitted is covered with a dispersing reflecting layer applied over an intermediate layer; and FIG. 2 is a perspective schematic view of a light source in which the light-emitting surface is formed with a microgroove structure to have a matte or ground-glass appearance, the side opposite that surface being coated with a light-reflecting and light-dispersing layer.

The light-emitting body, as seen in FIG. 1, is formed as a prismatic wedge 1, which has light coupled thereto to enter in the direction of the arrow A, for example generated by an incandescent lamp. The wedge body 1 has two major surfaces 2, 3 which are essentially flat or plane, and inclined with respect to each other. The major surface 2, which is the top surface in the figures, is the light-emitting surface; the opposite, or bottom surface 3, inclined with respect to the major surface 2, has a transparent coating 7 applied thereto. The transparent coating 7, covering the entire surface, is a lacquer which has an optical index of refraction which is less than the index of refraction of the material of the wedge 1. The layer 7 can be applied on the body 1, for example, by dipping the body 1 into the lacquer, or coating the lacquer on the bottom surface 3. If the body 1 is dipped into the lacquer, then the top surface 2 will also be coated with the lacquer. For purposes of the present invention, the layer 7 is the one which is material. It is covered additionally with a dispersing and reflecting pigment layer 8, for example a white lacquer. The narrow edge surface 4 which connects the inclined major surfaces 2, 3 together is the surface at which light is introduced—see arrow A. The surface 4 preferably extends at right angles with respect to the surface 3. Layers 7, 8 are shown greatly exaggerated in the drawing. A lamp, not shown, provides a source of visible radiation to the narrow side surface 4. The light which is coupled into the transparent wedge-shaped body 1 is totally reflected at the opposite side surfaces 5, 6. Total reflection also occurs at the respectively inclined major planes or surfaces 2, 3, depending on the angle of application of the light to the surface 4. A portion of the light will, however, be reflected from the coatings 7, 8 to be emitted at the major surface 2 of the wedge.

A portion of the light applied to the surface 4 will be emitted from the bottom surface 3 of the wedge-shaped body 1, and will reach the intermediate layer 7 and the reflective and dispersing pigment layer 8. It is redirected into the interior of the wedge-shaped body 1, irregularly and dispersed, and after further possible reflections, it will be emitted from the side surface 2 of the wedge 1 and thus will form part of the light being emitted therefrom.

The shape of the body 1 in the form of a prismatic wedge provides for essentially uniform light density of the light being emitted therefrom. Total reflection, dispersion, and refraction of the light in the body 1 all contribute to high light output and high overall efficiency of the light source with excellent uniformity of light emission throughout the surface 2.

Embodiment of FIG. 2: The light is introduced to the body 1' in the same manner and direction as in FIG. 1. The major surface 2' of the body 1 is formed by a plurality of uniformly spaced microgrooves 9, extending parallel to the bottom surface 5 of the body 1'. The microgrooves will give the appearance of a matte or ground-glass surface. The bottom surface 3 of the body 1 itself is covered with a dispersing and light-reflecting layer 10 which, for example, may be a white pigmental lacquer.

The light coupled into the wedge-shaped body 1 or 1' through the side surface 4 which connects the two inclined major surfaces 2, 3 is partially emitted by the surface 2 by interaction with the microgroove structure formed by the grooves 9. The light which reaches the bottom surface 3 of the body 1 itself is partially or totally reflected thereby. The still remaining portion which is not totally reflected by the bottom surface 3 is reflected by the layer 10. Layer 10, rather than being a lacquer coating, may be formed as white paper, or a white ceramic plate with an irregularly structured surface to provide for light dispersion, so that light within the wedge-shaped body 1 is both reflected and dispersed by the coating or layer or plate 10 and, possibly after further multiple reflection, is emitted through the light emission surface 2.

The light, as in the embodiment of FIG. 1, is emitted from the surface 2 with a high degree of uniformity, and high light output, that is, provides a high-efficiency light source with respect to the light input, due to the interaction of total reflection, dispersion, and refraction within, and at the boundary surfaces of the wedge-shaped body 1'.

A suitable material for the wedge-shaped body 1, or 1', respectively, is acrylic resin e.g. Plexiglas. Light can be introduced to the side edge 4 in various ways. For example, the light can be applied over a light distribution plate, constructed, for example, with square cross section, and deriving light from an incandescent lamp. One of the sides of the light distribution block formed thereby then can have a surface which fits against and matches the side surface 4 of the body 1, or 1', respectively. The wedge and the light distribution block can be formed as a single unitary element, with an opening or recess provided within the light distribution block to receive an incandescent lamp or any other suitable light source, possibly in combination with a reflector directing light from the light source through the distribution block into the side surface 4.

The structure is simple, sturdy, and essentially maintenance-free. It is particularly adapted as a background illumination device for indicators, for example LCDs in vehicles, such as in automotive use.

In a typical example, the surfaces 2, 3, were inclined with respect to each other at an angle of 1,5° and had dimensions in the direction of the microgroove 9 of 20 cm, and a transverse dimension of 10 cm. The dimension of the surface 4 was 6 cm$^2$. Illumination was derived from a single incandescent light bulb of W output.

Various changes and modifications may be made, and features described in connection with one of the embodiments may be used with the other, within the scope of the inventive concept.

If the entire body 1 (FIG. 1) is dipped in lacquer, a layer similar to layer 7 will form on the top surface 2 as well which, however, will have no effect on the light emission since the material of the layer 7 is transparent—except to additionally cause multiple reflections. Since this top layer will have no function in the operation, it has been omitted from FIG. 1.

I claim:

1. Large-area light source comprising
   a light-transmissive body (1), a form of a thin wedge having an essentially flat, light-emitting surface and being of essentially rectangular cross section, adapted to be exposed to a visible radiation source at one side surface,
   the wedge shaped light transmissive body has two major surfaces (2,3), which are inclined with respect to each other, one of said surface (2) forming the light-emitting surface.
   the side surface (4) which receives the visible radiation (A) is a surface which is angled off from said one, or light-emitting surface (2) and joins said one light-emitting major surface (2) to the other major surface (3) at an essentially right-angle junction with respect to said other major surface (3),
   and a thin, light-transmissive layer (7) is provided coating said other major surface (3) opposite the light-emitting surface of the wedge-shaped body (1), the optical index of refraction of said layer (7) being less than the optical index of refraction of the material of the wedge-shaped body (1);
   and a light-dispersing, light-reflecting pigment coating or layer (8) is provided, covering said light-transmissive coating or layer (7).

2. Light source according to claim 1, wherein the light-transmissive coating or layer (7) comprises a coating of clear lacquer, and the light-dispersing and reflective coating or layer (8) comprises an essentially white coating of lacquer applied to the clear lacquer coating (7).

3. Light source according to claim 1, wherein the light-emitting surface (2) has a surface which is matte.

4. Light source according to claim 3, wherein the light-emitting surface (2) is formed with a plurality of essentially uniformly located microgrooves (9) which extend transversely to the side surface (4) which receives the visible radiation (A).

* * * * *